US012711812B1

(12) United States Patent
Zhao et al.

(10) Patent No.: US 12,711,812 B1
(45) Date of Patent: Aug. 18, 2026

(54) UNCERTAINTY AWARE FUSION OF BIOMETRIC DATA

(71) Applicant: AMAZON TECHNOLOGIES, INC., Seattle, WA (US)

(72) Inventors: Rui Zhao, Bellevue, WA (US); Rajeev Ranjan, Seattle, WA (US); Manoj Aggarwal, Seattle, WA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 510 days.

(21) Appl. No.: 18/193,080

(22) Filed: Mar. 30, 2023

(51) Int. Cl.
*G06V 40/70* (2022.01)
*G06V 40/12* (2022.01)
*G06V 40/50* (2022.01)

(52) U.S. Cl.
CPC .......... *G06V 40/70* (2022.01); *G06V 40/1353* (2022.01); *G06V 40/1359* (2022.01); *G06V 40/1371* (2022.01); *G06V 40/50* (2022.01)

(58) Field of Classification Search
CPC ............... G06V 40/70; G06V 40/1359; G06V 40/1353; G06V 40/1371; G06V 40/50; G06V 40/00; G06V 40/107; G06V 40/1347; G06V 40/168; G06V 10/811; G06V 10/82; G06V 30/191; G06V 30/19127; G06V 30/1918
See application file for complete search history.

(56) References Cited

U.S. PATENT DOCUMENTS

2017/0091568 A1* 3/2017 Hama ........................ G06T 7/60
2019/0236394 A1* 8/2019 Price ..................... G06V 10/454
2019/0347523 A1* 11/2019 Rothberg ............... G06N 3/084
(Continued)

OTHER PUBLICATIONS

Kim JU, Park S, Ro YM. Uncertainty-guided cross-modal learning for robust multispectral pedestrian detection. IEEE Transactions on Circuits and Systems for Video Technology. Apr. 29, 2021;32(3):1510-23. (Year: 2021).*
(Continued)

*Primary Examiner* — Oneal R Mistry
*Assistant Examiner* — Duy Tran
(74) *Attorney, Agent, or Firm* — Weaver Austin Villeneuve & Sampson LLP

(57) ABSTRACT

Biometric data may be subject to internal and external factors that complicate assessment. Internal factors include variations due to physiological changes, such as dilation or constriction of blood vessels. External factors include variations in pose, illumination, cosmetics, and so forth. One or more machine learning networks are trained to accept as input images and their modality information and provide as output parameters of conditional distributions characterizing the uncertainty due to these internal and external factors. The input images are processed by embedding modules to determine input embedding data. Based on the associated output parameters, weight values may be calculated that are associated with distances in embedding space between input embedding data from multiple modalities and other embedding data corresponding to those modalities, such as from a previously enrolled user. The weight values and distances may then be used to determine if the input images correspond to the other embedding data.

20 Claims, 10 Drawing Sheets

(56) References Cited

U.S. PATENT DOCUMENTS

| | | | | |
|---|---|---|---|---|
| 2019/0392189 | A1* | 12/2019 | Kumar | G06V 10/80 |
| 2021/0103770 | A1* | 4/2021 | van Baar | G06F 18/214 |
| 2023/0004797 | A1* | 1/2023 | Chiu | G06N 3/094 |

OTHER PUBLICATIONS

Chang, et al., "Data Uncertainty Learning in Face Recognition", 2020 IEEE/CVF Conference on Computer Vision and Pattern Recognition (CVPR), 2020, 10 pgs. Retrieved from the Internet: URL: https://openaccess.thecvf.com/content_CVPR_2020/papers/Chang_Data_Uncertainty_Learning_in_Face_Recognition_CVPR_2020_paper.pdf.

Glen, Stephanie, "Conditional Distribution: Definition and Examples" From StatisticsHowTo.com:, 7 pgs. Retrieved from the Internet: URL: https://www.statisticshowto.com/conditional-distribution/.

Glen, Stephanie, "Posterior Probability & the Posterior Distribution" From StatisticsHowTo.com:, 5 pgs. Retrieved from the Internet: URL: https://www.statisticshowto.com/posterior-distribution-probability/.

Kendall, et al., "What Uncertainties Do We Need in Bayesian Deep Learning for Computer Vision?", Conference on Advances in Neural Information Processing Systems, NeurIPS 2017, Oct. 5, 2017, 12 pgs. Retrieved from the Internet: URL: https://arxiv.org/pdf/1703.04977.pdf.

Masi, et al., "Pose-Aware Face Recognition in the Wild," 2016 IEEE Conference on Computer Vision and Pattern Recognition (CVPR), 2016, 9 pgs. Retrieved from the Internet: URL: https://openaccess.thecvf.com/content_cvpr_2016/papers/Masi_Pose-Aware_Face_Recognition_CVPR_2016_paper.pdf.

Ranjan, et al., "Crystal Loss and Quality Pooling for Unconstrained Face Verification and Recognition", Journal of Latex Class Files, vol. 14, No. 8, Aug. 2015, 15 pgs. Retrieved from the Internet: URL: https://arxiv.org/pdf/1804.01159.pdf.

Shi, et al., "Probabilistic Face Embeddings", 2019 IEEE/CVF International Conference on Computer Vision (ICCV), 2019, 10 pgs. Retrieved from the Internet: URL: https://openaccess.thecvf.com/content_ICCV_2019/papers/Shi_Probabilistic_Face_Embeddings_ICCV_2019_paper.pdf.

Shi, et al., "Towards Universal Representation Learning for Deep Face Recognition", 2020, 10 pgs. Retrieved from the Internet: URL: https://openaccess.thecvf.com/content_CVPR_2020/papers/Shi_Towards_Universal_Representation_Learning_for_Deep_Face_Recognition_C.

* cited by examiner

HAND 102
100
FIELD OF VIEW (FOV) 110
CAMERA 108
INPUT DEVICE 104
COMPUTING DEVICE 106
TRAINING DATA 192
COMPUTING DEVICE(S) 118
INPUT IMAGE DATA 112
FIRST MODALITY IMAGE DATA 114
SECOND MODALITY IMAGE DATA 116
UNCERTAINTY MODULE(S) 120
INTERNAL UNCERTAINTY MODULE(S) 122
EXTERNAL UNCERTAINTY MODULE(S) 124
REPRESENTATION MODULE(S) 130
REPRESENTATION DATA 132
FIRST MODALITY REPRESENTATION DATA 134
SECOND MODALITY REPRESENTATION DATA 136
ENROLLED USER DATA 142
IDENTIFICATION DATA 144
ENROLLED REPRESENTATION DATA 146
ENROLLED EMBEDDING DATA 148
ENROLLED UNCERTAINTY DATA 150
...
EMBEDDING MODULE(S) 168
INPUT EMBEDDING DATA 170
FIRST EMBEDDING DATA 172
SECOND EMBEDDING DATA 174
...
COMPARISON MODULE 180
FUSION MODULE 182
WEIGHT DATA 184
DISTANCE MODULE 186
UNCERTAINTY DATA 126
COMPARISON DATA 188

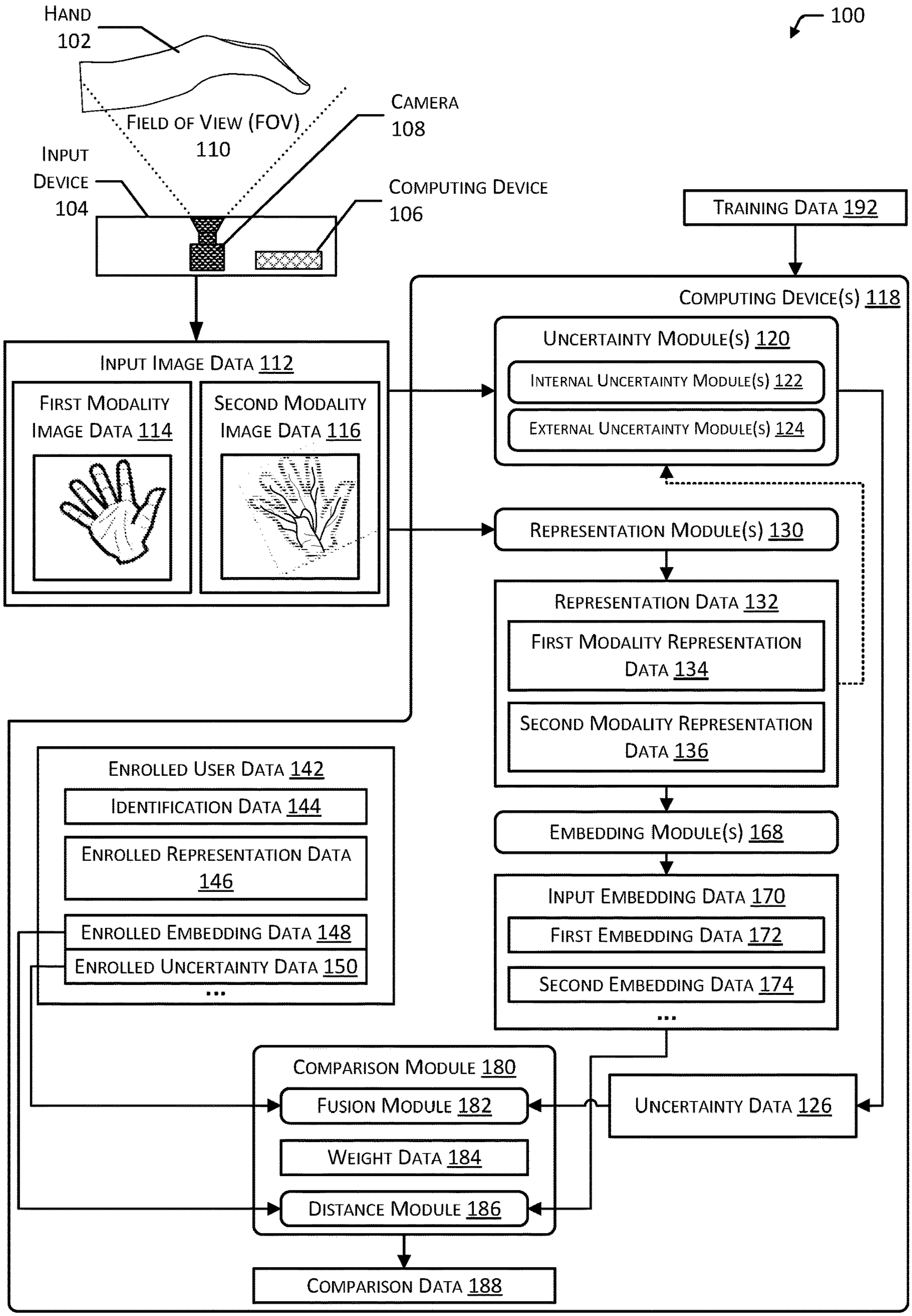

DETERMINE FIRST BIOMETRIC DATA ASSOCIATED WITH A FIRST MODALITY 1002

DETERMINE FIRST EMBEDDING DATA BASED ON THE FIRST BIOMETRIC DATA 1004

DETERMINE SECOND BIOMETRIC DATA ASSOCIATED WITH A SECOND MODALITY 1006

DETERMINE SECOND EMBEDDING DATA BASED ON THE SECOND BIOMETRIC DATA 1008

DETERMINE FIRST UNCERTAINTY DATA ASSOCIATED WITH THE FIRST EMBEDDING DATA 1010

DETERMINE SECOND UNCERTAINTY DATA ASSOCIATED WITH THE SECOND EMBEDDING DATA 1012

DETERMINE THIRD EMBEDDING DATA ASSOCIATED WITH THE FIRST MODALITY 1014

DETERMINE FOURTH EMBEDDING DATA ASSOCIATED WITH THE SECOND MODALITY 1016

DETERMINE THIRD UNCERTAINTY DATA ASSOCIATED WITH THE THIRD EMBEDDING DATA 1018

DETERMINE FOURTH UNCERTAINTY DATA ASSOCIATED WITH THE FOURTH EMBEDDING DATA 1020

DETERMINE A FIRST DISTANCE BASED ON THE FIRST EMBEDDING DATA AND THE THIRD EMBEDDING DATA 1022

DETERMINE A SECOND DISTANCE BASED ON THE SECOND EMBEDDING DATA AND THE FOURTH EMBEDDING DATA 1024

DETERMINE A FIRST WEIGHT VALUE BASED ON THE UNCERTAINTY DATA 1026

DETERMINE COMPARISON DATA BASED ON THE FIRST DISTANCE, THE SECOND DISTANCE, AND THE WEIGHT VALUE 1028

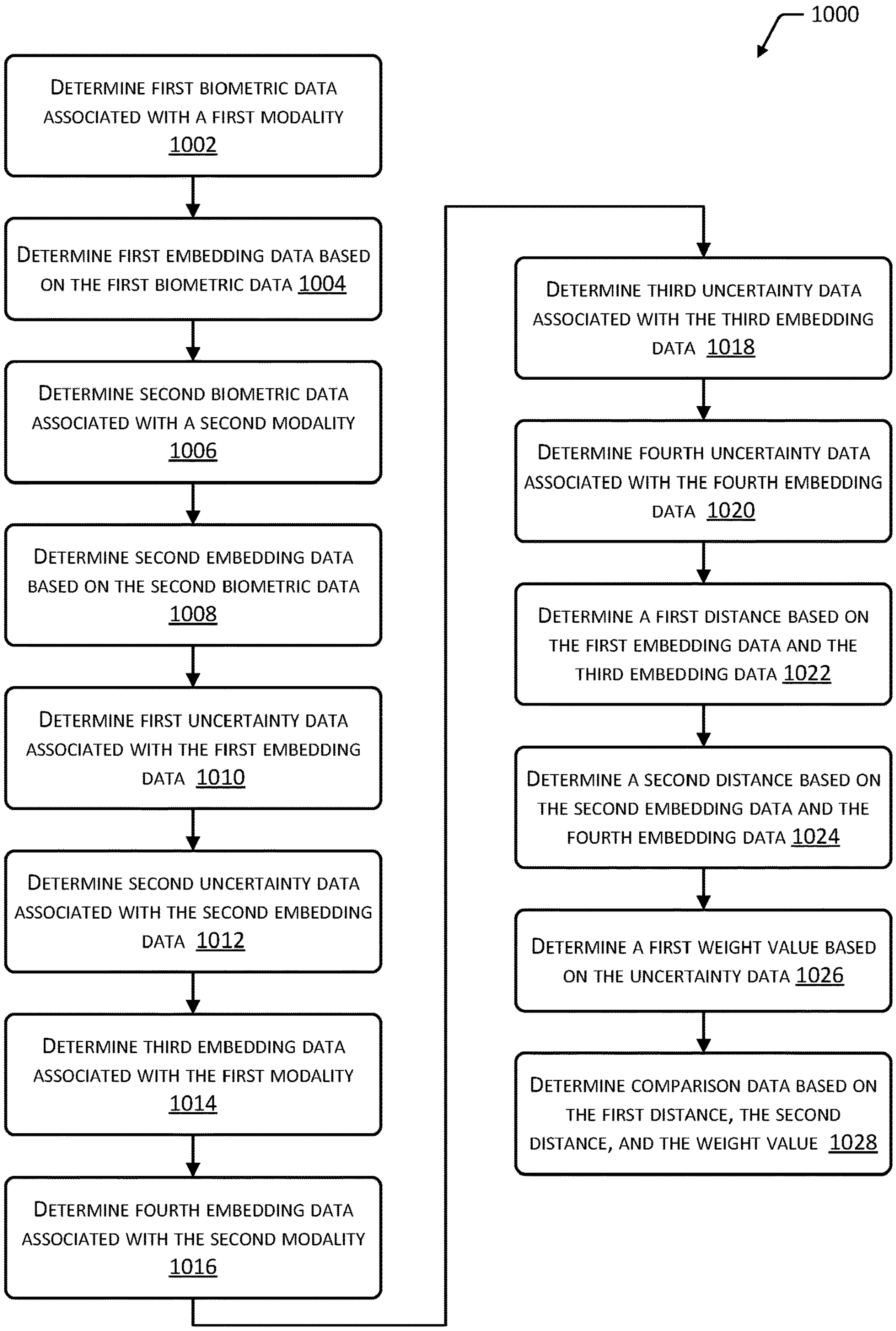

FIG. 10

UNCERTAINTY AWARE FUSION OF BIOMETRIC DATA

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 1 illustrates a first implementation of a biometric identification system that uses uncertainty aware fusion of multimodal biometric data.

FIG. 10 is a flow diagram of a process to determine comparison data based on uncertainty data, according to some implementations.

Figure 2:
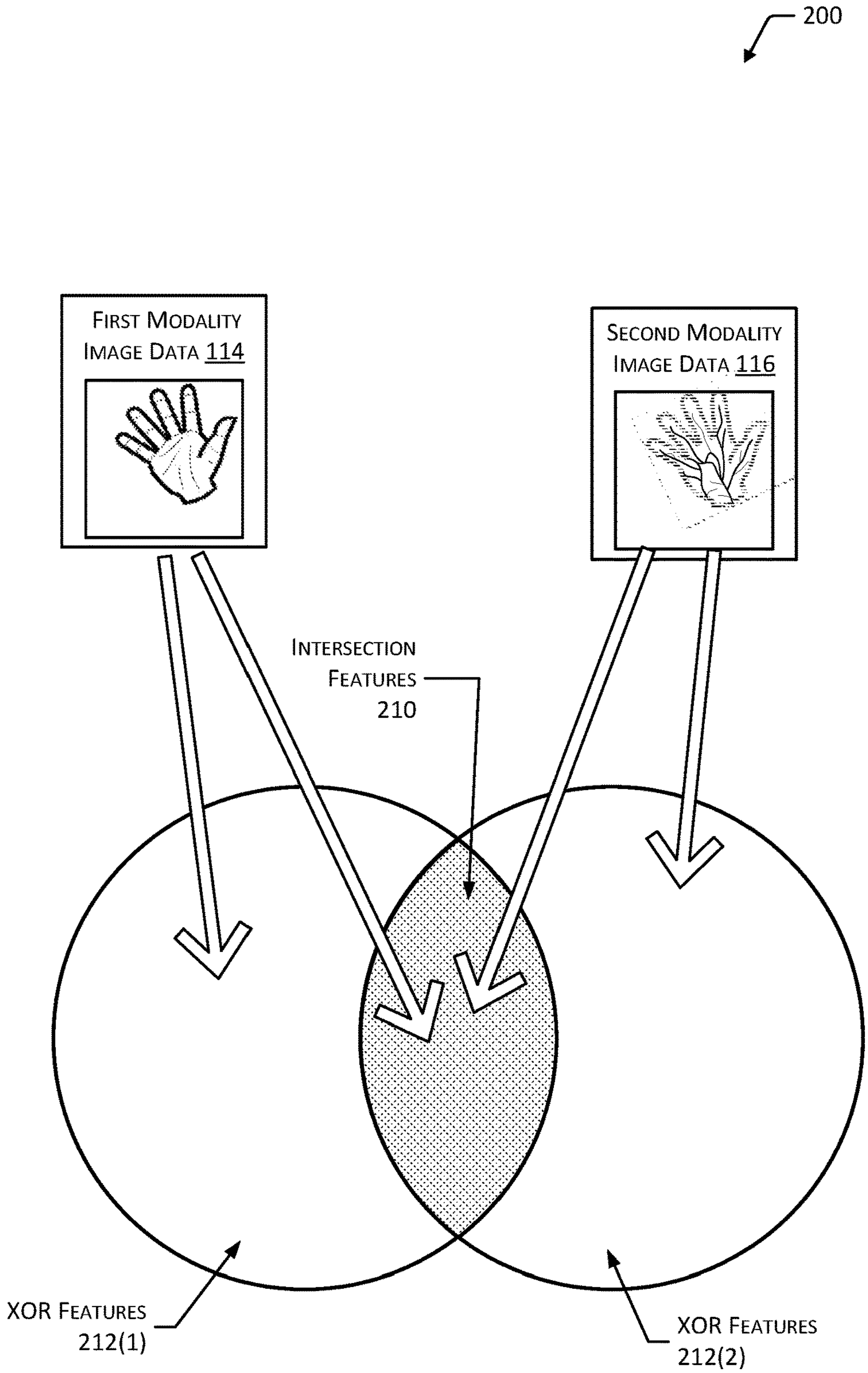
FIG. 2 is a diagram illustrating intersection features and decorrelated or XOR modality features for different modalities, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's hand (or a portion thereof such as the palm) while a second modality may comprise images of subcutaneous features such as veins of the user's hand (or portion thereof). The use of multi-modality input data provides several advantages for biometric identification. However, the input data may be affected by internal factors, external factors, or both.

Internal factors may comprise variations due to physiological changes of the user. For example, during enrollment a user's hand may be warm and the blood vessels therein are dilated. Continuing the example, at a later time the user's hand may be cold and the blood vessels therein are constricted. As a result, the visibility of veins may change from time to time. The internal factors may also be considered the saliency of biometric information that is intrinsic to the user. Continuing the earlier example, the visibility of the veins while the user's hand is warm provides more salient biometric information compared to if those veins are not visible due to a cold hand.

External factors may comprise variations associated with acquisition of the image. The external factors may include one or more of the pose of the hand relative to a scanner that is acquiring the input data, motion of the hand during acquisition, illumination of the hand during acquisition, presence of obscurants such as dirt, cosmetics, ink, and so forth on the hand during acquisition, and so forth.

Accuracy of biometric identification is improved by taking into consideration uncertainties associated with the internal factors, external factors, or both. Information associated with the different modalities used may be fused using a probabilistic technique that takes into consideration these uncertainties.

Uncertainty data may be determined using a trained machine learning network. In one implementation, a machine learning network ("network") may be trained to determine embedding data that is representative of the features depicted in an input image. The network, or a portion thereof, may be trained to determine at least a portion of the uncertainty data. Training data used to train the network may include information such as labels indicative of image quality, friction ridge minutiae, presence of obscurants, visibility of features, pose, and so forth.

The network is trained to accept input images and provide as output parameters of conditional distributions that characterize the uncertainty in those input images. For example, a first set of data comprising input images (acquired using two or more modalities) may be compared to previously stored enrolled data. The output parameters, and distances between embeddings of the sets may be used to determine the weight value.

The weight value may be used to fuse the data from the two or more modalities while comparing the two sets of data. For example, the weight value may be indicative of the weight to be accorded to the distance between embeddings of a particular modality. For example, in a situation in which the second modality depicting veins is more uncertain, more weight may be accorded to the embedding data associated with the first modality depicting surface features. In another example, in a situation in which the first modality depicting the surface features is more uncertain, more weight may be accorded to the embedding data associated with the second modality depicting subcutaneous features such as veins.

By using the techniques described in this disclosure, a biometric identification system is able to operate with substantial improvements in reducing false positives and false negatives. This improves overall accuracy with an associated improvement in trust in the biometric identification system.

Illustrative System

FIG. 1 illustrates a biometric identification system 100 that uses uncertainty aware fusion of multimodal biometric data, according to some implementations. The system 100 is described as being used with respect to determining an identity of a user based on biometric input. However, the system and techniques described herein may be used in other situations.

A hand 102 of a user is depicted positioned above an input device 104. The input device 104 may include a computing device 106 and a camera 108. The camera 108 has a field of view (FOV) 110. During operation of the input device 104, the camera 108 acquires images of an object in the FOV 110, such as the hand 102, and provides input image data 112. The input device 104 may include other components which are not shown. For example, the input device 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the input device 104.

In one implementation, the input device 104 is configured to acquire images of the hand 102 that are illuminated using infrared light that has two or more particular polarizations, with different illumination patterns, and so forth. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In the implementation depicted here, the input device 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image.

A computing device 118 is shown. One or more computing device(s) 118 may store the following data, execute one or more of the following modules, and so forth.

Training data 192 may comprise input image data 112, such as input image data 112 acquired using one or more modalities. For example, the training data 192 may comprise first modality image data 114 and second modality image data 116. The input image data 112 in the training data 192 may be associated with label data. For example, the label data may be indicative of modality, identity and so forth.

The training data 192 may comprise one or more of actual input data with associated label data or synthetic input data with associated label data. The actual input data may comprise actual input image data 112 that has been acquired from individuals who have opted in to provide training data 192. In one implementation, the training data 192 may exclude individuals who have enrolled to use of the system for identification. In another implementation, some enrolled users may opt in to explicitly permit input image data 112 obtained during enrollment to be stored as actual input data for later training. The training data 192 is discussed in more detail with regard to FIG. 3.

One or more uncertainty modules 120 are trained using the training data 192 to determine input uncertainty data 126. The input uncertainty data 126 may comprise parameters of conditional distributions that characterize uncertainty in the input. These parameters may be representative of internal factors, external factors, or both, that are associated with biometric input data.

Internal factors may comprise variations due to physiological changes of the user. For example, during enrollment a user's hand may be warm and the blood vessels therein are dilated. Continuing the example, at a later time the user's hand may be cold and the blood vessels therein are constricted. As a result, the visibility of veins may change from time to time. The internal factors may also be considered the saliency of biometric information that is intrinsic to the user. Continuing the earlier example, the visibility of the veins while the user's hand is warm provides more salient biometric information compared to if those veins are not visible due to a cold hand.

External factors may comprise variations associated with acquisition of the image. The external factors may include one or more of the pose of the hand relative to a scanner that is acquiring the input data, motion of the hand during acquisition, illumination of the hand during acquisition, presence of obscurants such as dirt, cosmetics, or ink that are on the hand during acquisition, and so forth. The external factors may also include effects on acquired images due to variations in equipment manufacture, obscurants on optical components such as lenses, environmental conditions such as sunlight, aging effects on the input device 104 such as drop in LED illuminator intensity, and so forth.

In some implementations the uncertainty modules 120 may comprise one or more internal uncertainty modules 122 or external uncertainty modules 124. The uncertainty modules 120 may determine uncertainty data 126. For example, the internal uncertainty module 122 may determine internal uncertainty data indicative of uncertainties associated with the internal factors. In another example, the external uncertainty module 124 may determine external uncertainty data indicative of uncertainties associated with the external factors.

The uncertainty module(s) 120 may accept as input one or more of the input image data 112, or representation data 132 as described next. The training and operation of the uncertainty module(s) 120 is discussed in more detail with regard to FIGS. 3 and later.

A representation module 130 may be trained using the training data 192 to determine representation data 132. The representation module 130 is determined by training one or more initial embedding models to determine embedding data that may be used for identification. Each initial embedding model comprises a plurality of layers. For example, an embedding model using a convolutional neural network architecture may include convolutional layers, pooling layers, activation layers, and so forth. A separate embedding model, or a branch of a common embedding model, may be used for each modality to be used. The training results in trained model data, such as weight values of particular nodes in the layers. Once training is complete, a subset of the layers of these initial embedding models are extracted and used as representation models that are implemented in the representation module 130. Each subset includes a first layer of the respective embedding model. The representation module 130 comprises the subset of extracted layers and associated trained model data associated with the extracted layers. Determination of the representation module 130 and its use is discussed in more detail below.

During a representation module training time, training data 192 may be used to train a representation module 130 to determine representation data 132. In one implementation, the training data 192 may comprise a plurality of first modality and second modality images that have been labeled. For example, label data may indicate the sample identifier, identity label, modality label, and so forth. The training data 192 is discussed in more detail with regard to FIG. 2.

The representation module 130 may comprise one or more machine learning networks, each having a plurality of layers. As part of the determination of the representation module 130, trained model data that is associated with one or more of the portions of the machine learning network is determined. The machine learning networks described in this disclosure may utilize various architectures and types, such as convolutional neural networks, recurrent neural networks, transformer networks, and so forth. The machine learning network and the determination of the representation module 130 are discussed in more detail with regard to FIG. 3.

Once trained, the representation module 130, or a portion thereof, may be used at inference to process input such as input image data 112 and provide as output the representation data 132.

During enrollment time, users are able to utilize the system 100 by performing an enrollment process. An enrollment module (not shown) may coordinate the enrollment process. Enrollment may associate biometric information, such as representation data 132 with particular information such as a name, account number, and so forth.

During an enrollment process, the user opts in and presents their hand 102 to the input device 104. The input device 104 determines input image data 112. The trained representation module 130 accepts as input the input image data 112 and provides as output representation data 132. In one implementation, the trained representation module 130 is executed on the computing device 106 of the input device 104. In another implementation, such as shown in FIG. 1, a computing device 118 executes the trained representation module 130.

The representation data 132 is representative of at least some of the features depicted in the input image data 112. In some implementations, the representation data 132 may comprise one or more of tensors, vectors, or other information.

During the enrollment process, the submitted representation data 132 may be processed by a comparison module 180 to determine whether the user has been previously enrolled. A successful enrollment may comprise storage of enrolled user data 142 comprising identification data 144, such as name, telephone number, account number, and so forth and storage of one or more of the representation data 132 or data based thereon as enrolled representation data 146. In some implementations, the enrolled user data 142 may comprise one or more of input embedding data 170 or data based thereon as enrolled embedding data 148. In some implementations, the enrolled user data 142 may also include enrolled uncertainty data 150. The enrolled uncertainty data 150 may comprise uncertainty data 126 that is associated with one or more of the enrolled representation data 146 or the enrolled embedding data 148.

During identification time the (as yet unidentified) user presents their hand 102 at the input device 104. The resulting query input image data 112 may be processed by the (now trained) representation module 130 to determine representation data 132. In some implementations, the computing device 106 may execute the trained representation module 130. The computing device 106 may perform other functions, such as encryption and transmission of the input image data 112 or data based thereon, such as the representation data 132.

The comparison module 180 executing on the computing device(s) 118 may accept as input the input representation data 132 associated with the input image data 112 acquired by the input device 104. The input representation data 132 may be processed by one or more embedding modules 168 to determine input embedding data 170.

In one implementation, the representation data 132 associated with each modality may be processed by a respective embedding module 168. For example, a first embedding module 168(1) may accept as input the first modality representation data 134 and provide as output first embedding data 172 in a first embedding space. Continuing the example, a second embedding module 168(2) may accept as input the second modality representation data 136 and provide as output second embedding data 174 in a second embedding space. In other implementations, a single embedding module 168 may accept as input the representation data 132 associated with a plurality of modalities.

In other implementations the embedding modules 168 may generate additional embedding data. The embedding modules 168 may determine decorrelated ("XOR") embedding data that is indicative of features that are not associated with both the first modality image data 114 and the second modality image data 116. For example, the XOR embedding data represents features that are present in one modality but not the other. The XOR embedding data may then be subsequently processed as described below.

The embedding modules 168 may determine intersection embedding data that is indicative of features that are associated with both the first modality image data 114 and the second modality image data 116. For example, the intersection embedding data represents features that are present in both modalities. The XOR and intersections are discussed in more detail with regard to FIG. 2.

Figure 7:
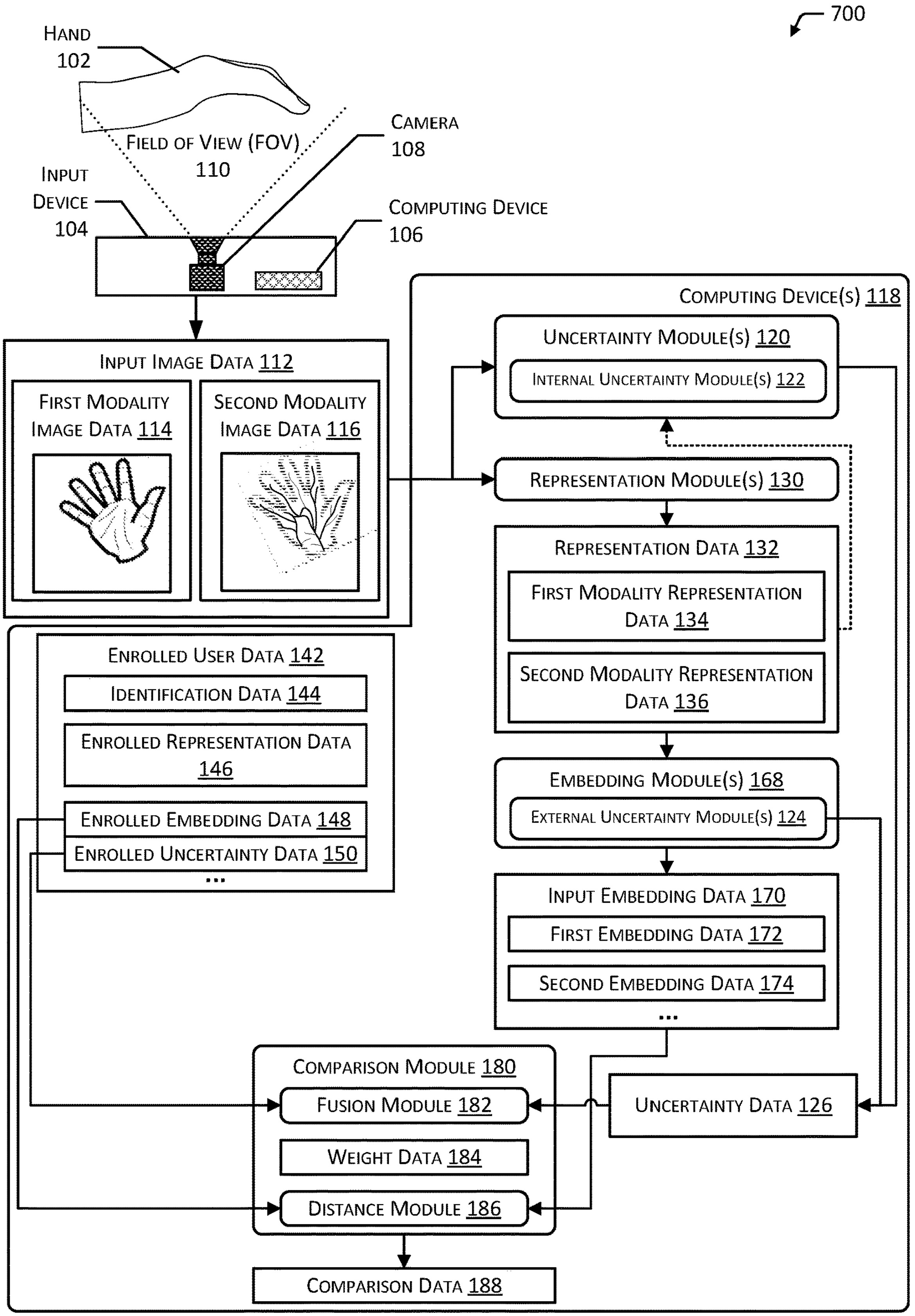
FIG. 7 illustrates a second implementation of a biometric identification system that uses uncertainty aware fusion of multimodal biometric data.

In some implementations, such as discussed with regard to FIG. 7, at least a portion of the uncertainty data 126 may be determined by at least a portion of the embedding module(s) 168.

The input embedding data 170 may then be compared by a comparison module 180 to previously stored data, such as the enrolled embedding data 148 to determine comparison data 188. If the comparison data 188 indicates that the correspondence between the input embedding data 170 and the previously enrolled embedding data 148 exceeds a threshold value, an identity may be asserted to a user who presented their hand 102. For example, if the distances in the first and second embedding spaces between the input embedding data 170 and the previously stored enrolled embedding data 148 is less than a threshold maximum distance, the identification data 144 associated with that enrolled embedding data 148 may be asserted. In other implementations other techniques may be used for the comparison.

As mentioned earlier, the input to the biometric identification system is subject to various factors that introduce uncertainty. The comparison module 180 may comprise a fusion module 182 that utilizes the uncertainty data 126 to determine weight data 184. The weight data 184 may indicate one or more weights that specify how to combine or fuse the information associated with the different modalities. For example, if the uncertainty data 126 indicates that second modality image data 116 is less certain (more uncertain) than the first modality image data 114, the weight data 184 may assign a relatively greater weight to the first embedding data 172 as compared to the second embedding data 174. The weight data 184 may comprise one or more parameters associated with conditional distributions that characterize uncertainty.

A distance module 186 may accept as input the input embedding data 170, other information such as enrolled embedding data 148, and the weight data 184 to determine the comparison data 188. For example, the parameters may be used to determine the relative weights for distances in embedding spaces that are associated with particular modalities.

Based on the weight data 184, a distance module 186 may be used to determine the comparison data 188. For example, if the distances as weighted based on the weight data 184 are less than specified threshold values for respective embedding spaces, a match between the input and the other data such as the enrolled representation data 146 may be determined.

In some implementations, instead of or in addition to the enrolled user data 142, the comparison module 180 may compare other sets of input image data 112. For example, during a single session in which a plurality of input images of the hand 102 are acquired using the input device 104, the comparison module 180 may be used to provide comparison data 188 with respect to various scenarios. For example, the comparison module 180 may provide comparison data 188 between the first modality image data 114 and the second modality image data 116 to determine if the same hand 102 is being depicted in both. In another example, the comparison module 180 may provide comparison data 188 between a first set of input image data 112(1) and a second set of input image data 112(2) to determine if the same hand 102 is being presented in both sets.

Figure 8:
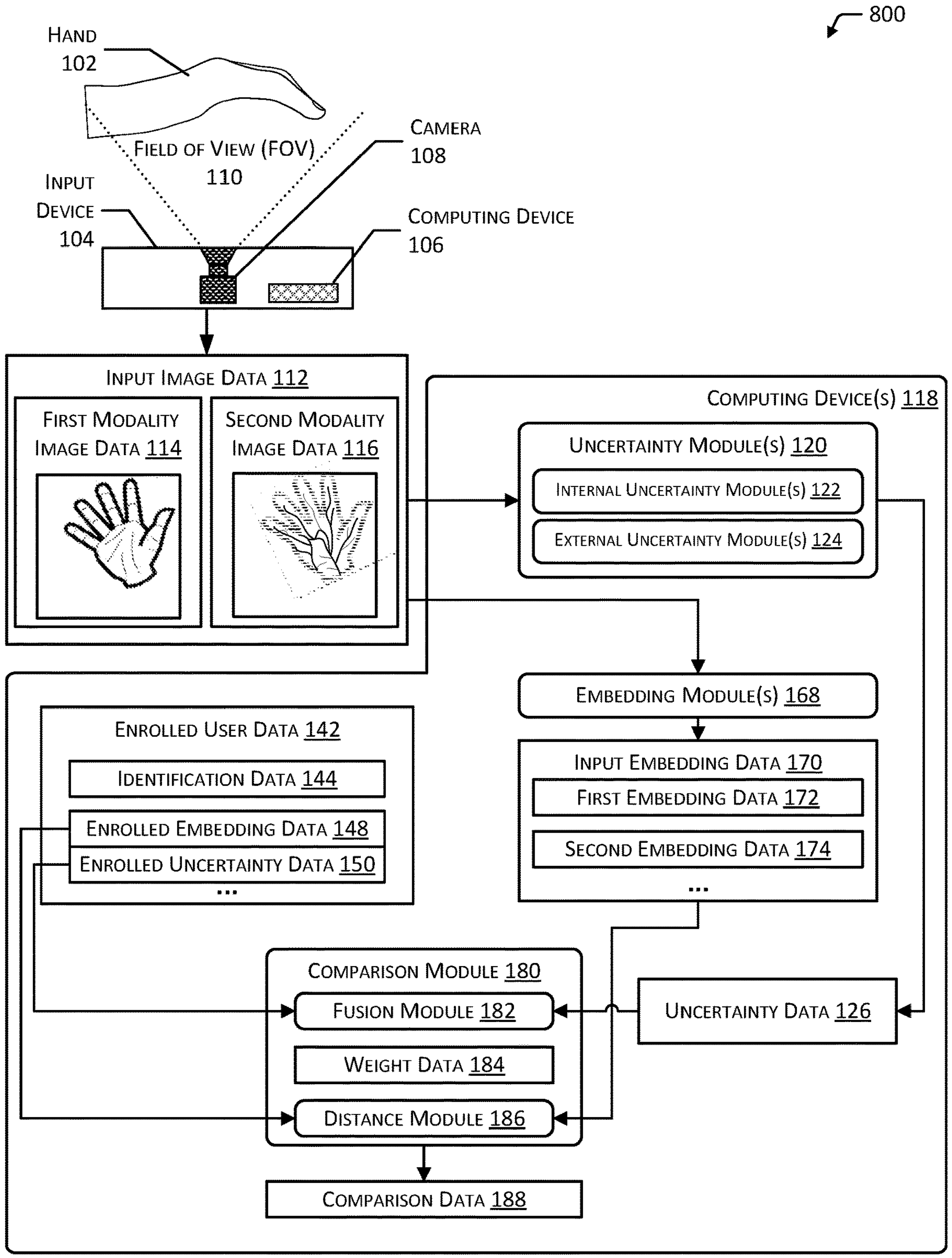
FIG. 8 illustrates a third implementation of a biometric identification system that uses uncertainty aware fusion of multimodal biometric data.

It is understood that various configurations of the system may be utilized. For example, the system 100 utilizes representation data 132. In another implementation, such as depicted in FIG. 8, representation data 132 may be omitted.

The uncertainty data 126 may be determined based on various inputs, such as the input image data 112 or data that is representative of the input image data 112. For example, as shown in FIG. 1 the uncertainty modules 120 may determine the uncertainty data 126 based on the representation data 132.

The comparison data 188 may then be used by subsequent systems or modules. For example, the comparison data 188 may be used to determine asserted identification data that is provided to a facility management module.

The facility management module may use the asserted identification data to associate an identity with the user as they move about a facility. For example, the facility management module may use data from cameras or other sensors in the environment to determine a location of the user. Given a known path of the user from an entrance that utilizes the input device 104, the user identity indicated in the identification data 144 may be associated with the user as they use the facility. For example, the now identified user may walk to a shelf, remove an item, and leave the facility. The facility management module may determine the interaction data indicative of the removal of the item as being associated with the user identifier specified in the asserted identification data, and bill an account associated with the user identifier. In another implementation, the facility management module may comprise a point-of-sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

FIG. 2 is a diagram 200 illustrating intersection features and XOR modality features for different modalities, according to some implementations. Two modalities are shown by way of illustration, and not necessarily as a limitation. In some implementations, additional modalities may be used. For example, an Mth modality may be used that comprises a color visible light image such as produced by a red-green-blue (RGB) camera, a thermal image as produced by a thermal imaging camera, or other information.

Depending on the techniques used to acquire an image, images may contain features that are common across two or more modalities (an intersection), or distinct with respect to the other modalities (an exclusive "or", or "XOR"). In the following example, the first modality image data 114 depicts surface features of the hand 102 and the second modality image data 116 depicts subcutaneous features of the hand 102. Some examples of features that are common across both modalities are the overall outline of the hand, deep creases in the palm and joints, and so forth. Features such as these would be represented in the overlap between modalities, shown as the intersection features 210. In comparison, a feature that appears in one modality but not in another may be considered distinct or exclusive. The first modality XOR features 212(1) are those features that are distinct to the first modality. The second modality XOR features 212(2) are those features that are distinct to the second modality. Continuing the earlier example, the first modality XOR features 212(1) may include fine details such as friction ridges present on fingers and palm. In comparison, the second modality XOR features 212(2) may include vein patterns beneath the skin.

An embedding module 168 may be trained to determine input embedding data 170 that is representative of one or more of the intersection features 210 or the XOR features 212. The embedding module 168 may be trained utilizing loss values relating to both the intersection and the XOR features, resulting in the system learning to decorrelate features that are common across modalities. Colloquially, it may be said that portions of the embedding module 168 learn to extract features that are unique to a particular modality, minimizing learning features that may be present across modalities that are highly correlated.

In some implementations involving three or more modalities (not shown), the system 100 may utilize information for partial intersection features. The partial intersection features comprise those features represented in the overlap between two or more modalities, but less than all modalities. For example, a partial intersection feature may comprise a feature that is represented in two modalities but not the third modality.

Figure 3:
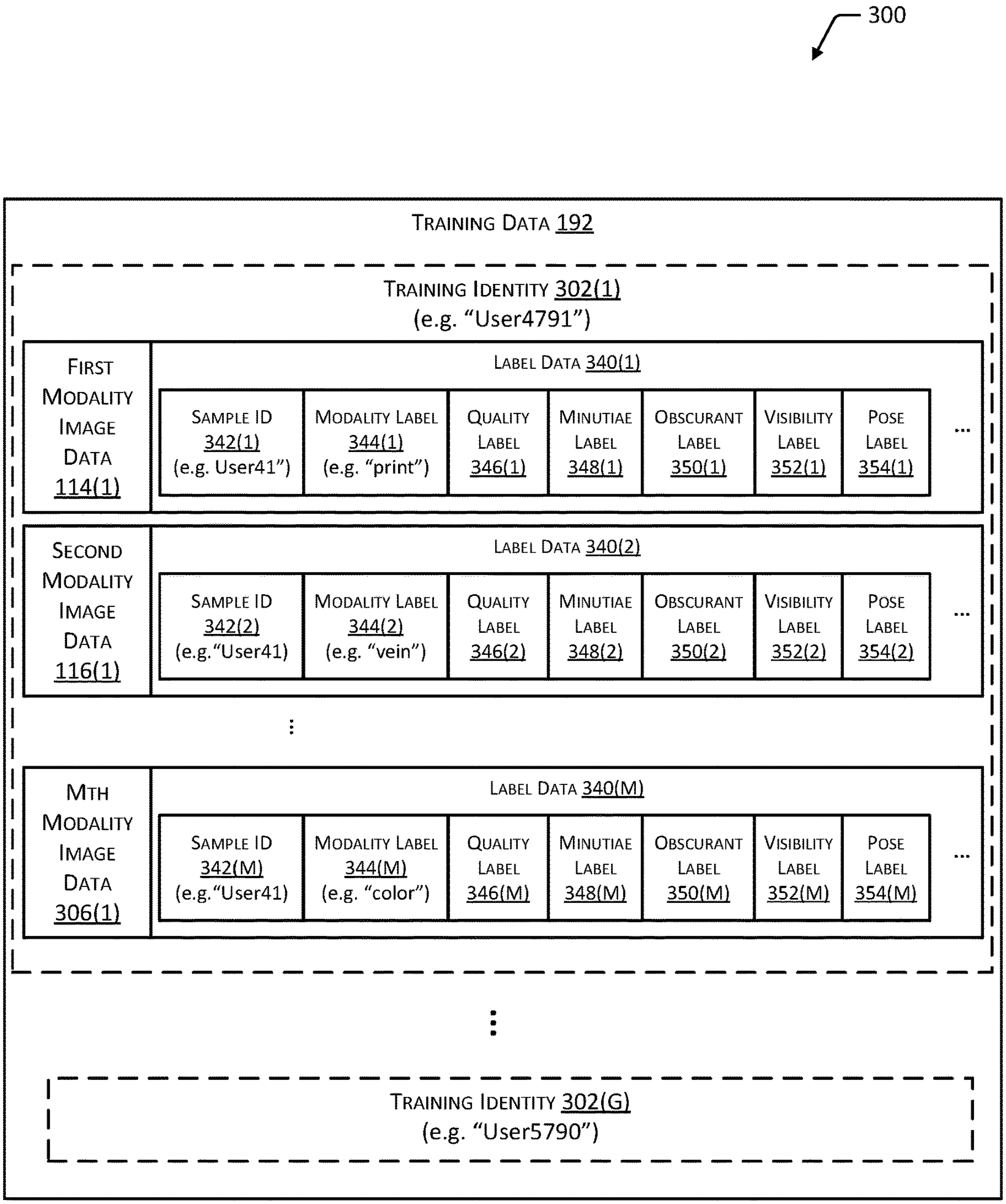
FIG. 3 illustrates training data that is labeled for training a machine learning network to determine internal uncertainty and external uncertainty, according to some implementations.

FIG. 3 illustrates at 300 training data 192 that is labeled for training a machine learning network to determine internal uncertainty and external uncertainty, according to some implementations. In some implementations, the training data 192 or a portion thereof may be used to train one or more of the uncertainty modules 120, representation modules 130, embedding modules 168, and so forth.

The training data 192 comprises a plurality of images that are representative of a plurality of training identities, 302(1), 302(2), . . . , 302(G). In some implementations, instead of or in addition to the image data, the training data 192 may comprise representation data 132.

Each training identity 302 is considered to be unique with respect to the other training identities 302. A count of entries in the training data 192 may comprise a total count of the training identities 302(G).

The information associated with each training identity 302 may comprise actual image data acquired from users who have opted in to provide information for training, synthetic input data that has been generated, or a combination thereof. In one implementation, the training data 192 may exclude individuals who have enrolled to use of the system for identification. For example, enrolled users having identification data 144 may be excluded from inclusion in the training data 192. In another implementation, some enrolled users may opt in to explicitly permit input image data 112 obtained during enrollment to be stored as training data 192.

The synthetic input data may comprise synthetic data that is consistent with expected input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 302(1)-302(G) includes modality image data and associated label data 340. The label data 340 may comprise information such as a sample identifier (ID) 342, modality label 344, quality label 346, minutiae label 348, obscurant label 350, visibility label 352, pose label 354, and so forth.

The sample ID 342 indicates a particular training identity. The sample ID 342 may be used to distinguish one training identity 302 from another. In implementations where actual input data is used as part of the training data 192, the sample ID 342 may be assigned independently of the actual identification data 144 associated with that user. For example, the sample ID 342 may have a value of "User41" and not the actual identity of "Herschel Patel".

The modality label 344 indicates whether the associated image data is representative of a first modality, second modality, and so forth.

The quality label 346 may comprise information indicative of the quality of the associated image data. For example, the quality label 346 may be indicative of whether the image is in focus, is underexposed, over exposed, blurred, and so forth. In some implementations the quality label 346 may be indicative of, or based on, contrast, brightness, persistent SuperPoint (PSP), and so forth.

The minutiae label 348 may comprise information indicative of friction ridge minutiae that are depicted in the image. For example, the minutiae label 348 may comprise description information about the minutiae, a count of minutiae features depicted, or other information.

The obscurant label 350 may comprise information indicative of whether an obscurant such as dirt or cosmetics is present on the hand 102 or other portion of the user that is depicted in the image. For example, the obscurant label 350 may specify an area of the image, percentage of the image, characteristics of the obscuration such as whether the obscuration is total (due to an opaque obscurant) or partial.

The visibility label 352 may comprise information indicative of whether features are depicted in the image. For example, the visibility label 352 may be indicative of a count of features in the image, whether the entire hand 102 is visible in the image, and so forth.

The pose label 354 may comprise information indicative of the pose of the hand 102 or other portion of the user as depicted in the image. For example, the pose label 354 may specify an angle or a range of angles of the hand 102 such as yaw, pitch, or roll relative to an image plane of the camera 108.

In other implementations, other labels may be included. For example, a quality of compression label indicative of a quality of compression. In another example, a compression type label may be indicative of the compression algorithm used to compress the image data. In yet another example, a temperature label may be indicative of a temperature of the hand.

In some implementations data associated with some labels may be incomplete. For example, a particular image or modality may have null information associated with particular labels. The uncertainty modules 120 may be trained using training data 192 that includes null values for some label data 340.

In this illustration, each training identity 302(1)-302(G) includes first modality image data 114(1) and associated sample ID 342(1) and modality label 344(1), and second modality image data 116(1) and associated sample ID 342(2) and modality label 344(2). As used in this disclosure with respect to reference numbers, a letter within parenthesis may represent a nonzero positive integer value. For example, the training data 192 may comprise a nonzero positive integer number of instances of training identities 302, such as having training identity 302(14) or training identity 302 (348098541).

In implementations where additional modalities are used, the training data 192 for a training identity 302 may also include Mth modality image data and associated sample ID 342(M) and modality label 344(M).

Figure 4:
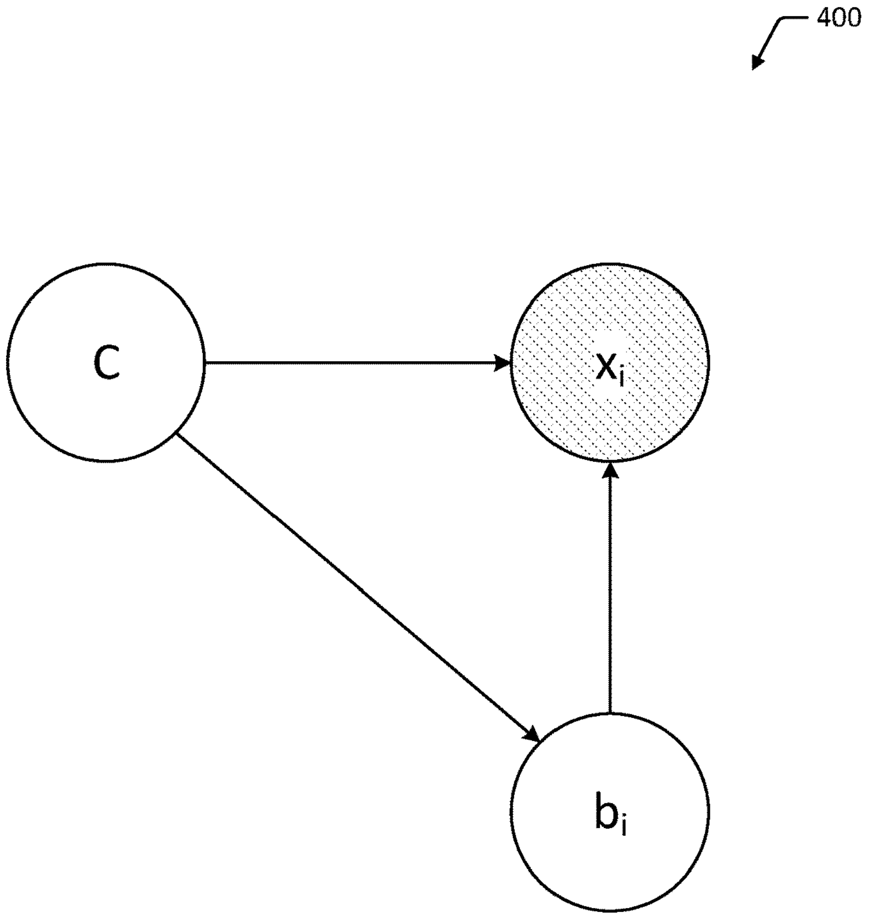
FIG. 4 illustrates a probabilistic graphical model of a first implementation of uncertainty awareness, according to some implementations.

FIG. 4 illustrates a probabilistic graphical model 400 of a first implementation of uncertainty awareness, according to some implementations. As mentioned earlier, the input to the biometric identification system is subject to various factors that introduce uncertainty.

A probabilistic decision approach to fusing the information provided by the different modalities may be used. For example, when comparing two sets of input data, a closest match may be determined by maximizing the posterior distribution of identity given images associated with different modalities. Using Bayes rule and assuming a uniform prior distribution on identity, the maximization of posterior distribution is converted to maximization of log-likelihood of different images. For example, the closest match in this approach may be determined using Equation 1:

$$c^* = \arg\max_c P(c|\{b_i, x_i\}_{i\in\{p,v\}}) = \arg\max_c \log P(c|\{b_i, x_i\}_{i\in\{p,v\}}) = \arg\max_c \sum_{i\in\{p,v\}} \log P(x_i|b_i, c)$$

where:

i is the index for modality, $x_i$ is modality-specific image, $b_i$ is the modality, and c is the identity.

Equation 1

In these equations, for ease of discussion the first modality may be referred to as "print" while the second modality may be referred to as "vein". In other implementations, other modalities may be used instead of the first or second modality, additional modalities may be used, and so forth.

Information about the uncertainty present in input data may be used to improve overall performance of the biometric identification system. Uncertainty with regard to the input image data 112 may be subject to internal factors and external factors.

As described above, internal factors may comprise variations in the acquired biometric data due to physiological changes of the user. The internal factors may also be considered the saliency of biometric information that is intrinsic to the user. In contrast, external factors may comprise variations associated with acquisition of the biometric data.

Uncertainty due to internal factors may be expected to increase as the population of users increases, demographics of users change, and so forth. Uncertainty due to external factors may be expected to persist with ongoing use due to variations in usage patterns, changes in the input devices 104, and so forth.

The internal uncertainty may be considered by re-deriving equation one with a different modeling assumption. With regard to Equation 2, $b_i$ may be treated as a random variable representing the physiological modality of biometric input, instead of the image modality captured by the device. This allows a dependency between c and b to be introduced as follows:

$$P(c|\{b_i, x_i\}_{i\in\{p,v\}}) = \frac{\prod_{i\in\{p,v\}} P(x_i|b_i, c)P(b_i|c)P(c)}{P(\{b_i, x_i\}_{i\in\{p,v\}})} \propto \prod_{i\in\{p,v\}} P(x_i|b_i, c)P(b_i|c)P(c)$$

Equation 2

This dependency is motivated by the insight that not every identity has an equally informative modality. For example, one hand 102(1) may have less prominent vein visibility than another hand 102(2). With this in mind, P $(b_i|c)$ can be considered as the likelihood of emitting information associated with modality i. This likelihood may be interpreted as the saliency of the biometric information. A greater likelihood should indicate more salient biometric information of the corresponding modality. Given Equation 2, Equation 1 may be re-defined into the following form:

$$c^* = \arg\max_c \sum_{i\in\{p,v\}} \log P(x_i|b_i, c) + \log P(b_i|c)$$

Equation 3

With regard to Equation 3, a uniform distribution of P (c) may be assumed. The probabilistic graph model 400 depicts the dependency of Equation 3. The modeling assumption indicates $b_i$ is conditionally independent given c instead of being marginally independent. In general, the number of physiological modalities does not necessarily equal the capture image modality.

To determine external uncertainty, the estimation of $P(x_i|b_i, c)$ may be modeled as a Gaussian distribution. The external uncertainty may be determined using Equation 4 shown below.

$$P(x_i|b_i, c) \sim N(c|\mu(x_i), \sigma(x_i)I) = (2\pi)^{-\frac{1}{2}}\sigma_i^{-D} \exp\left\{-\frac{1 - e_{ix}^T e_{ic}}{\sigma_i^2}\right\}$$

where μ(•) represents an embedding mean of an encoding function, and σ(•) represents a variance of the encoding function of an image.

Equation 4

Equation 4 may assume no external uncertainty during an enrollment process. This assumption is valid given an enrollment process that involves higher threshold for inputs, use of multiple inputs, and so forth. For example, the enrollment process may place strict limits on hand pose, blurriness, clean hands, and so forth. In another example, the enrollment process may utilize several sets of input data. For example, two or more instances of input image data 112 may be acquired and used. Additionally, given the relatively short time between acquisition of those instances of input image data 112, the extent of physiological change that may cause internal uncertainties between instances of input image data 112 may be deemed to be relatively low.

For the following equation, let D be the dimension of an embedding vector. For example, the input embedding data 170 may comprise an embedding vector. Let e be a unit norm embedding vector. Equation 5 may be determined by taking a log of Equation 4:

$$\log P\left(x_i|b_i, c\right) = -D \log \sigma_i - \frac{1 - e_{ix}^T e_{ic}}{\sigma_i^2}$$

Equation 5

Given a cosine similarity such as $$e_{ix}^T e_{ic},$$

the value of Equation 5 is also dependent on variance σ. A smaller variance will likely yield a higher value of Equation 5. Assuming that P(c) is uniformly distributed, Equations 2 and 5 may be used to yield Equation 6:

$$c^* = \underset{c}{\operatorname{argmax}} \sum_{i \in \{p,v\}} \log P(x_i|b_i, c) + \log P(b_i|c) = \underset{c}{\operatorname{argmax}} \sum_{i \in \{p,v\}} -D\log\sigma_i - \frac{1 - e_{ix}^T e_{ic}}{\sigma_i^2} + \log P(b_i|c)$$

Equation 6

If $\sigma_i$ is assumed to be a constant and $P(b_i|c)$ is uniformly distributed, Equation 6 may be simplified to average cosine similarity as shown in Equation 7.

$$c^* = \underset{c}{\operatorname{argmax}} \sum_{i \in \{p,v\}} e_{ix}^T e_{ic}$$

Equation 7

In some implementations the external uncertainty of interactions such as query and enrollment may be determined using Equation 8. With Equation 8, the likelihood $P(x_i|b_i, c)$ is defined based on mean and variance of both x and c.

$$P(x_i|b_i, c) \sim N\left(c\middle|\mu(x_i) - \mu(c), \left(\sigma^2(x_i) + \sigma^2(c)\right)I\right) = (2\pi)^{-\frac{D}{2}}\left(\sigma_i^2 + \sigma_c^2\right)^{-\frac{D}{2}}\exp\left\{-\frac{1 - e_{ix}^T e_{ic}}{\sigma_i^2 + \sigma_c^2}\right\}$$

Equation 8

Equation 9 may be determined by taking the log of Equation 8.

$$\log P(x_i|b_i, c) = -\frac{D}{2}\log\left(\sigma_i^2 + \sigma_c^2\right) - \frac{1 - e_{ix}^T e_{ic}}{\sigma_i^2 + \sigma_c^2}$$

Equation 9

The awareness of uncertainty afforded by these equations may be used by the fusion module 182 using Equation 3 to assess internal uncertainty. For $P(x_i|b_i, c)$, Equation 10 may be used.

$$P(x_i|b_i, c) = 1 - \min(1, d_i)$$

Equation 10

For $P(b_i|c)$ a quantity that corresponds to the saliency of the biometric information of the corresponding modality may be used. In one implementation, a quality score may be estimated using information such as machine learning models trained to determine quality of the surface features depicted in the first modality image data 114, quality of the subcutaneous features depicted in the second modality image data 116, and so forth. In another implementation, Equation 6 may be used that captures both internal and external uncertainty. In this implementation, an estimation of both embedding vectors and its variance may be used. In one implementation an embedding norm may be used as the variance. In another implementation a confidence estimation may be used to estimate variance.

The fusion module 182 may implement one or more of these equations to determine the comparison data 188.

Figure 5:
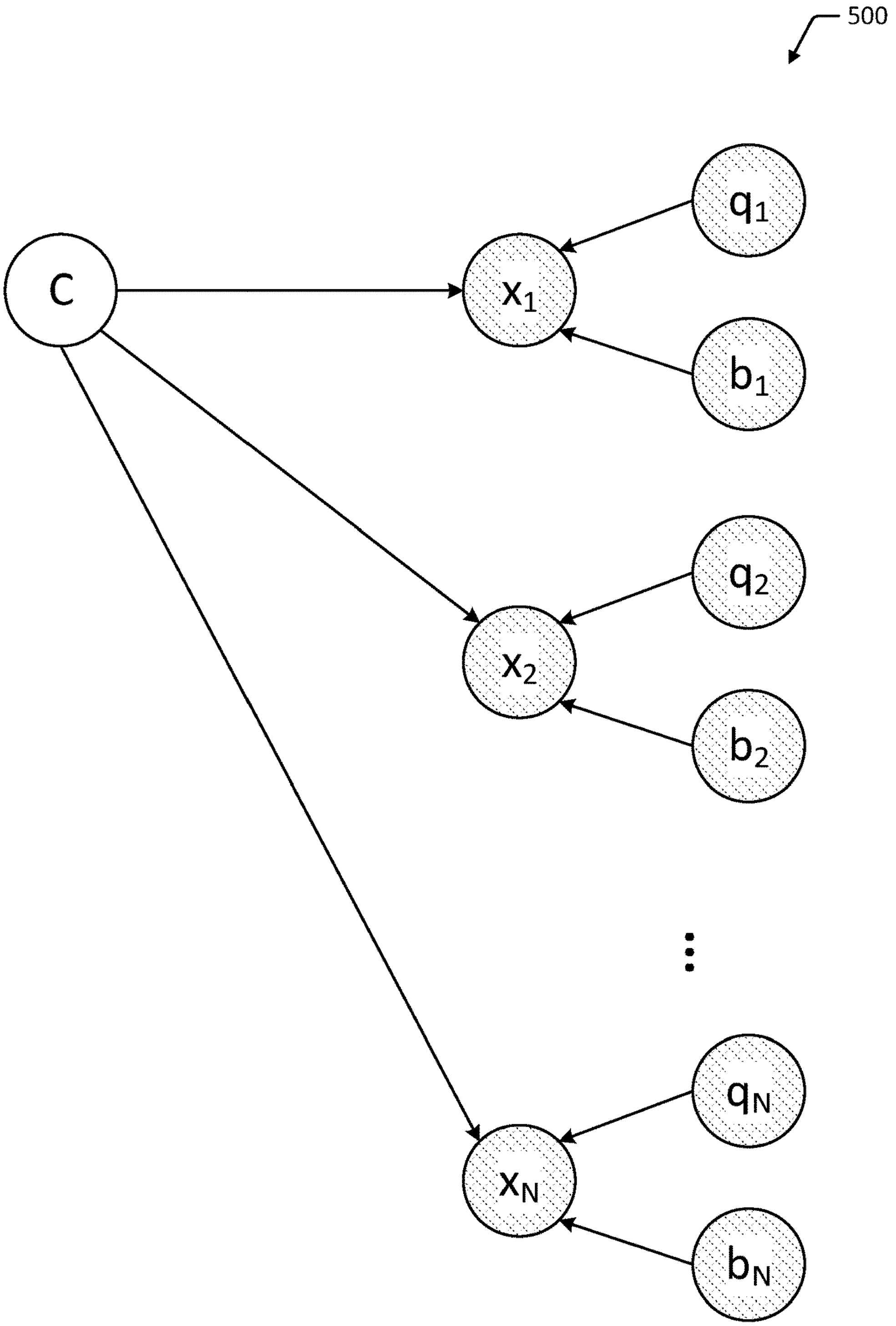
FIG. 5 illustrates a probabilistic graphical model of a second implementation of uncertainty awareness, according to some implementations.

FIG. 5 illustrates a probabilistic graphical model 500 of a second implementation of uncertainty awareness, according to some implementations.

In some situations a biometric identification system may exhibit false negatives in which the presented biometric information of an enrolled user is deemed to not correspond to that enrolled user. Many false negatives may be attributed to two situations: inconsistent visibility of subcutaneous features, or presence of an obscurant on the hand 102. Subcutaneous features such as veins may be inconsistently visible between enrollment and subsequent identification. For example, physiological changes may alter venous presentation. Obscurants such as dirt, cosmetics such as sunscreen, lotions, ink, grease, and so forth may also result in a difference between enrollment and subsequent identification.

The false negatives may thus be attributed to variations in the information associated with subcutaneous features, such as provided by the second modality. In comparison, information about surface features, such as provided by the first modality may be less affected. Additionally, first modality information about surface features may contain sufficient information to assert identity in some situations. In such a situation, the fusion model may determine weight data 184 that attributes more weight to the first modality and associated data, and less to the second modality and associated data. As described above, additional information such as decorrelated or XOR embeddings or intersection embeddings may also be consider by the comparison module 180. The comparison module 180 may also take into consideration information about visibility of features, such as veins in the second modality image data 116, presence of obscurants, and so forth as described next.

In the following, for ease of discussion the first modality may be referred to as "print" while the second modality may be referred to as "vein". In other implementations, other modalities may be used instead of the first or second modality, additional modalities may be used, and so forth.

In one implementation, the fusion module 182 may determine a fused distance value for use by the distance module 186 using Equation 11:

$$p_{fused} = 1.0 + \frac{\log(1 - \min(1, d_p)) + \log(1 - \min(1, d_v))}{2}$$

where $d_p$ is a distance in a first embedding space associated with the first modality (print) and $d_v$ is a distance in a second embedding space associated with the second modality (vein)

Equation 11

In another implementation, the fusion module 182 may be expanded to take into consideration additional information about the input, such as the visibility of features, presence of obscurants (such as dirt), and so forth. One example of this is shown in Equation 12:

$$P_{fused_{quality}} = 1.0 + \frac{w_p * \log(1 - \min(1, d_p)) + w_v * \log(1 - \min(1, d_v))}{w_p + w_v}$$

where $d_p$ and $d_v$ are as described above in Equation 11, and $w_p$ is a weight based on the print quality, and $w_v$ is a weight based on the vein quality.

Equation 12

Equation 12 may be derived as follows. Let $(x_i, b_i, q_i)$ denote an observation, where $x_i$ is a d-dimensional embedding vector generated from a specific biometric $b_i$ and $q_i$ is the quality associated with biometric $b_i$. Different biometric modalities, such as the first modality and the second modality, may utilize different spatial regions of the biometric input data, such as different portions of the hand 102. For example, one modality may use information from a first region such as a palm, another modality may use information from a second region such as fingers, and so forth. Different levels of quality may also be associated with these regions, associated modalities, or both. As earlier, let c denote the customer's identity label (such as their sample ID 342) that is to be estimated given a set of N observations.

The probabilistic graphical model (PGM) 500 depicts the generation of N biometric observations. Input image data 112 acquired from an input device 104 may be subsequently processed by one or more embedding modules 168 to determine the input embedding data 170 comprising embedding vectors. The PGM 500 is a directed acyclic graph (DAG) in which the shaded nodes correspond to the observed random variables and the unshaded node ("c") corresponds to the unobserved random variable. In this illustration, one unknown variable "c" represents the unknown identity of the user that impacts each of the collected biometric samples $x_i$ along with each corresponding biometric modality label $b_i$ and quality label $q_i$, which are known. As a result, the a-posteriori probability $p(c|\{x_i, b_i, q_i\}_{i=1 \ldots N})$ describes the user's identity based on N collected biometric signals. The value of c may then be determined using a maximum a-posteriori (MAP) classifier as follows:

$$c^* = \underset{c}{\operatorname{argmax}}\, p\left(c \middle| \{x_i, b_i, q_i\}_{i=1}^{N}\right) =$$

$$\underset{c}{\operatorname{argmax}}\left\{p(c)\prod_{i=1}^{N} p(x_i, b_i, q_i, c)\right\} = \underset{c}{\operatorname{argmax}}\left\{\log p(c) + \sum_{i=1}^{N} \log p(x_i|b_i, q_i, c)\right\}$$

Equation 13

Based on Equation 13, assuming a uniform prior on c, Equation 14 may be determined as follows:

$$c^* = \operatorname{argmax} \sum\nolimits_{i=1}^{N} \log p(x_i|b_i, q_i, c)$$

Equation 14

The likelihood $p(x_i|b_i, q_i, c)$ may then be calculated using Equation 15: $p(x_i|b_i, q_i, c) \propto (1 - \min(1, d_i))^{w_i}$ Equation 15

Based on Equation 15, Equation 16 may be determined:

$$\operatorname{argmax} \sum_{i=1}^{N} \log p(x_i|b_i, q_i, c) = \operatorname{argmax} \sum_{i=1}^{N} w_i * \log(1 - \min(1, d_i))$$

where, $d_i$ is the distance corresponding to a given user c for $i^{th}$ biometric, and $w_i$ is the quality weight associated with the $i^{th}$ biometric.

Equation 16

Returning to Equation 12, in one implementation the value of $w_p$ may be determined based on print quality scores, such as Orientation Certainty Level (OCL), algorithms that determine blur, and so forth. The value of $w_v$ may be determined based on vein visibility scores, obscurant scores, and so forth.

For ease of illustration and not necessarily as a limitation, the following discussion describes the derivation of $w_v$ and $w_p$ is fixed at 1.0.

In one implementation, $w_v$ may be determined based on vein visibility and obscurant scores ("dirt") as follows:

$$W_{vv} = \min(W_{vv}, W_{dirt})$$

Equation 17

$$W_{vv} = \left(\frac{1}{1 + e^{\alpha_{vv}} * \min\left(s_{vv_{recog}}, s_{vv_{enroll}}\right) + \beta_{vv}}\right) * \left(\frac{1 - e^{\frac{Y_{vv}}{\left|s_{vv_{recog}} - s_{vv_{enroll}}\right|}}}{1 + e^{\frac{Y_{vv}}{\left|s_{vv_{recog}} - s_{vv_{enroll}}\right|}}}\right)$$

Equation 18

$$W_{dirt} = \frac{1}{1 + e^{\alpha_{dirt}} * \min\left(s_{dirt_{recog}}, s_{dirt_{enroll}}\right) + \beta_{dirt}}$$

Equation 19 where, for Equations 17-19

$w_{vv}$ is a weight derived from the vein visibility score, $w_{dirt}$ is a weight from the obscurant score, $\alpha_{vv}$, $\beta_{vv}$, and $\gamma_{vv}$ are hyper-parameters for computing $w_{ww}$, $\alpha_{dirt}$, $\beta_{dirt}$ are hyper-parameters for computing $w_{dirt}$, $s_{vv_{recog}}$ is a vein visibility score for recognition interactions, $s_{vv_{enroll}}$ is a vein visibility score for enrollment interactions, $s_{dirt_{recog}}$ is an obscurant score for recognition interactions, and $s_{dirt_{enroll}}$ is an obscurant score for enrollment interactions.

In one implementation, during the enrollment process, a gallery of vein visibility scores and a gallery of obscurant scores may be determined based on the input image data 112 provided during the enrollment interactions. Also determined are print (first embedding data 172) and vein (second embedding data 174) that may be stored as enrolled embedding data 148.

During a recognition of query operation, a top k instances of enrolled embedding data 148 are retrieved. For example, the top ten best matches of enrolled embedding data 148 may be retrieved for each of the modalities. Associated vein visibility and obscurant scores are also retrieved. For example, the vein visibility and obscurant scores may be stored with, or associated with, the enrolled embedding data 148. This information may be provided as input, and using the equations described above, the vein weight $w_v$ may be calculated.

The computation of $w_{dirt}$ may use the logits from an obscurant quality model as an input. A linear transformation may then be performed on the score, followed by application of a sigmoid function. Given that a false negative is observed when either the input image data 112 associated with enrollment or recognition have an obscurant present on the palm, a minimum obscurant score of the recognition-enrollment comparison pair may be used.

The computation of $w_w$ is based on the insight that false negatives due to vein visibility tend to occur when the vein visibility differs between the recognition-enrollment comparison pair. In this situation, an absolute difference between the vein visibility score at recognition and enrollment is used. It may be advantageous to assign a lower weight to the situations in which the minimum vein visibility between a comparison pair is below a threshold value.

In some implementations, as assumption may be made that obscurant and vein visibility are independent of one another. Given this, the final vein weight may be determined as the minimum of the obscurant weight and the vein visibility weight, as shown above with regard to Equation 17.

With regard to Equations 18 and 19, in one implementation the hyper-parameters may be as follows:

TABLE 1

| |
|---|
| $\alpha_{vv} = -1.0$ |
| $\beta_{vv} = -5.0$ |
| $\gamma_{vv} = -4.0$ |
| $\alpha_{dirt} = -1.0$ |
| $\beta_{dirt} = 2.5$ |

In addition to the first embedding data 172 associated with the first modality (e.g. print) and the second embedding data 174 associated with the second modality (e.g. vein), the techniques may utilize additional information such as the decorrelated ("XOR") embedding data for one or more modalities, intersection embedding data for one or more modalities, and so forth.

The fusion module 182 may implement a quality aware probabilistic fusion by implementing Equation 20:

$$p_{fused} = 1.0 + \frac{\log(1-\min(1, d_p)) + \log(1-\min(1, d_{px})) + w_v * \log(1-\min(1, d_v)) + w_v * \log(1-\min(1, d_i))}{2 + 2 * w_v}$$

where $d_p$ is a first distance between the prints or first modality embeddings in the first embedding space, $d_{px}$ is a second distance between the decorrelated (XOR) embeddings of the prints or first modality embeddings, $d_v$ is a third distance between the embeddings of the veins or second modality embeddings, and $d_i$ is a fourth distance between the intersection embeddings representative of features common between both the first and second modalities.

Equation 20

Figure 6:
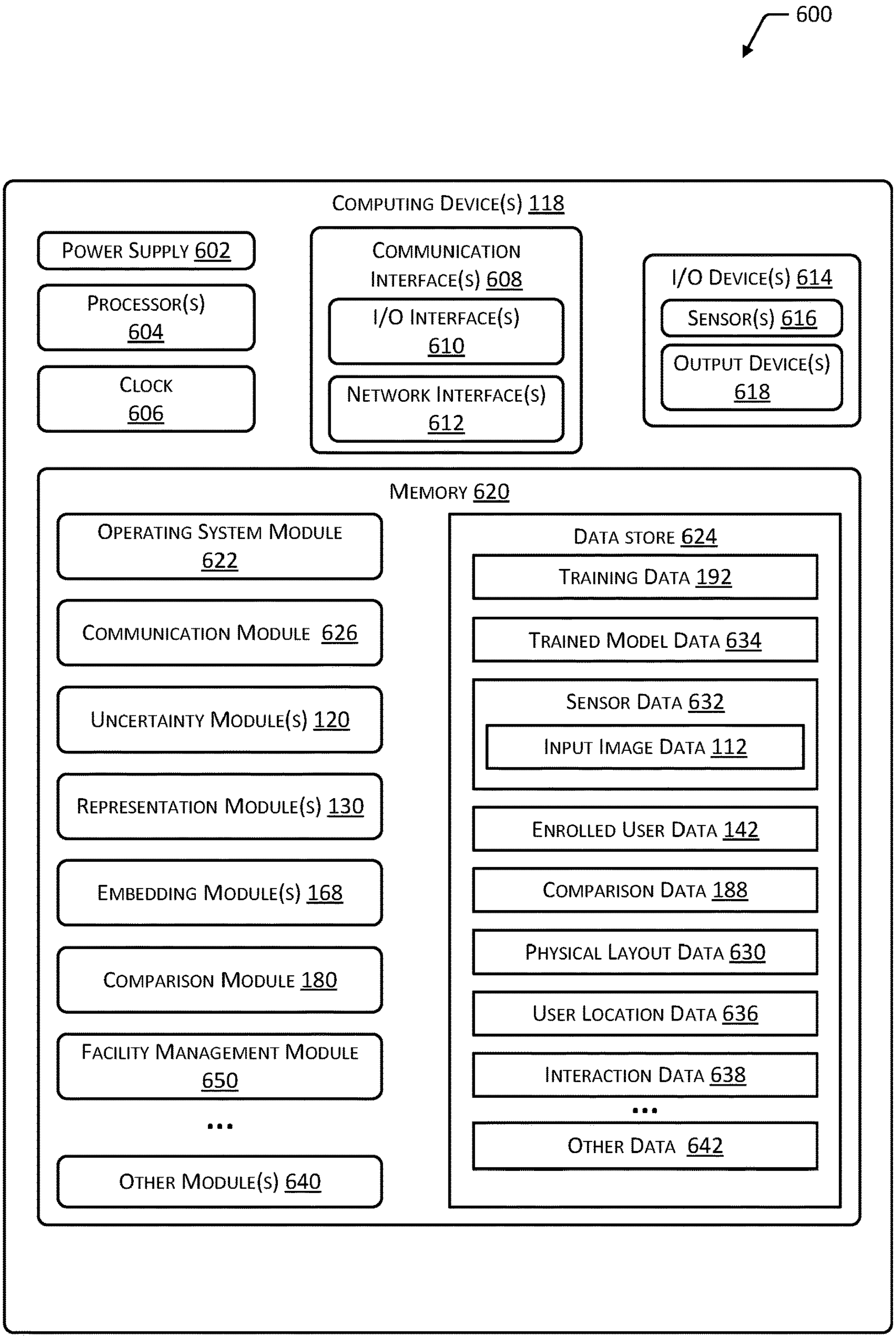
FIG. 6 is a block diagram of a computing device to implement the system, according to some implementations.

FIG. 6 is a block diagram 600 of a computing device 118 to implement the system, according to some implementations. The computing device 118 may be within the input device 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (Saas)", "platform computing", "network-accessible platform", "cloud services", "data centers", and so forth. Services provided by the computing device 118 may be distributed across one or more physical or virtual devices.

One or more power supplies 602 may be configured to provide electrical power suitable for operating the components in the computing device 118. The one or more power supplies 602 may comprise batteries, capacitors, fuel cells, photovoltaic cells, wireless power receivers, conductive couplings suitable for attachment to a power source such as provided by an electric utility, and so forth. The computing device 118 may include one or more hardware processors 604(processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 118 may include one or more communication interfaces 608 such as input/output (I/O) interfaces 610, network interfaces 612, and so forth. The communication interfaces 608 enable the computing device 118, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 118 or may be externally placed. The sensors 616 may comprise the camera 108, smartcard readers, touch sensors, microphones, and so forth.

The network interfaces 612 may be configured to provide communications between the computing device 118 and other devices, such as routers, access points, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 6, the computing device 118 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 118. Several functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 626 may be configured to establish communications with the computing device 118, servers, other computing devices 106, or other devices. The communications may be authenticated, encrypted, and so forth.

The uncertainty module(s) 120 may be stored in the memory 620.

The representation module(s) 130 may be stored in the memory 620.

The embedding module(s) 168 may be stored in the memory 620.

The comparison module 180 may be stored in the memory 620.

A facility management module 650 may be stored in the memory 620 and is discussed more below.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including other computing devices 106, network attached storage devices, and so forth.

The data store 624 may store the training data 192, and other information. The data store 624 may store trained model data 634 determined during training of the one or more modules. The data store 624 may store enrolled user data 142.

In some implementations, the input image data 112 may be temporarily stored during processing by the representation module 130. For example, the input device 104 may acquire the input image data 112, determine representation data 132 based on the input image data 112, and then erase the input image data 112. The resulting representation data 132 may then be sent to a server or other computing device 118 to perform enrollment, for comparison to assert an identity, and so forth.

The facility management module 650 may perform various functions, such as tracking items between different inventory locations, to and from carts, generating restocking orders, directing operation of robots within the facility, using the asserted identification data to associate a particular user identity with a user in the facility, and so forth. During operation, the facility management module 650 may access sensor data 632 such as input image data 112, or data from other sensors 616.

Information used by the facility management module 650 may be stored in the data store 624. For example, the data store 624 may be used to store physical layout data 630, sensor data 632, asserted identification data, user location data 636, interaction data 638, and so forth. For example, the sensor data 632 may comprise the input image data 112 obtained from an input device 104 associated with the facility.

The physical layout data 630 may provide information indicative of where scanners 104, cameras, weight sensors, antennas for radio receivers, inventory locations, and so forth are within the facility with respect to one another. For example, the physical layout data 630 may comprise information representative of a map or floor plan of the facility with relative positions of gates with scanners 104 and inventory locations.

The facility management module 650 may generate the user location data 636 that is indicative of the location of the user within the facility. For example, the facility management module 650 may use image data obtained by the cameras to determine a location of the user. In other implementations, other techniques may be used for determining the user location data 636. For example, data from a smart floor may be used to determine the location of the user.

The identification data 144 may be associated with user location data 636. For example, the user enters the facility and has their hand 102 scanned by the input device 104, resulting in asserted identification data that is associated with their time of entry and the input device 104 location. The user location data 636 indicative of a path of a user that begins at the input device 104 location at the time of entry may be associated with the user identifier in the asserted identification data.

Based on the user location data 636 and the interaction data 638, a particular interaction may be associated with an account of a particular user. For example, if the user location data 636 indicates that the user is present in front of inventory location 692 at time 09:02:02 and the interaction data 638 indicates a pick of a quantity of one item from an area on inventory location 692 at 09:04:13, the user may be billed for that pick.

The facility management module 650 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 650 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 650 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the asserted identification data to bill an account associated with a particular user.

FIG. 7 illustrates at 700 a second implementation of a biometric identification system that uses uncertainty aware fusion of multimodal biometric data, according to some implementations.

In this implementation, the internal uncertainty module 122 accepts as input one or more of the input image data 112 or the representation data 132 and determines a portion of the uncertainty data 126. For example, the internal uncertainty module 122 may be trained to determine the parameters of input image data 112 that are associated with internal factors.

In comparison to the implementation of FIG. 1, in this implementation the external uncertainty module 124 comprises a portion of the embedding module 168. For example, the embedding module 168 may be trained to determine input embedding data 170 as well as a portion of the uncertainty data 126. Continuing the example, the embedding module 168 may determine the parameters of input image data 112 that are associated with external factors.

In other implementations the embedding modules 168 may generate additional embedding data. The embedding modules 168 may determine XOR embedding data that is indicative of features that are not associated with both the first modality image data 114 and the second modality image data 116. For example, the XOR embedding data represents features that are present in one modality but not the other. The XOR embedding data may then be subsequently processed as described below.

The remainder of the system as shown at 700 operates as described previously, such as with regard to FIG. 1.

FIG. 8 illustrates at 800 a third implementation of a biometric identification system that uses uncertainty aware fusion of multimodal biometric data, according to some implementations.

In comparison to the implementation of FIG. 1, in this implementation the representation data 132 is not used. The uncertainty modules 120 accept as input the input image data 112 and determine as output the uncertainty data 126. The embedding modules 168 accept as input the input image data 112 and determine as output the input embedding data 170.

In some implementations, the enrolled user data 142 may comprise input image data 112 of the user that is stored as gallery data. In such implementations, the gallery data is encrypted and otherwise secured.

The remainder of the system as shown at 800 operates as described previously, such as with regard to FIG. 1.

Figure 9:
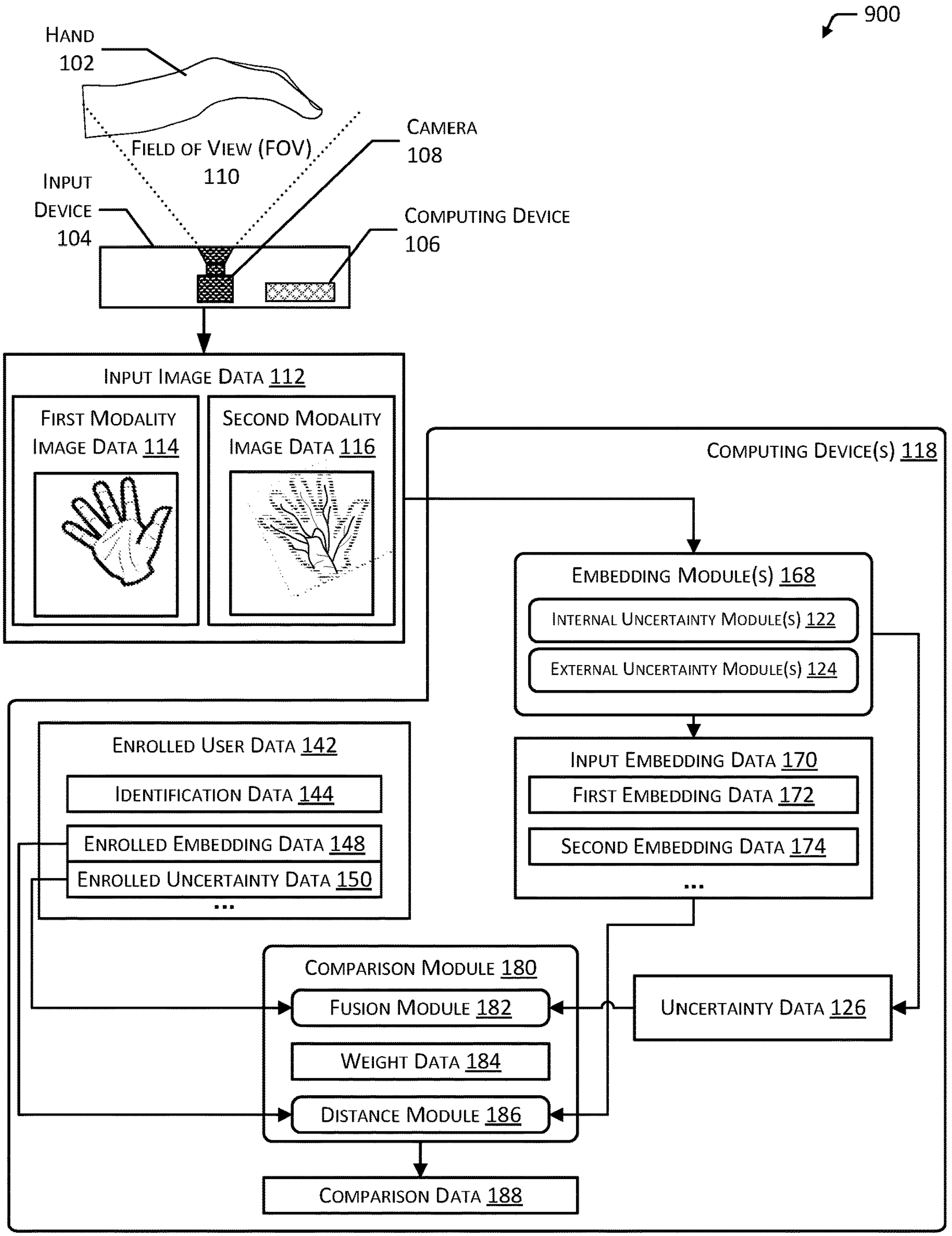
FIG. 9 illustrates a fourth implementation of a biometric identification system that uses uncertainty aware fusion of multimodal biometric data.

FIG. 9 illustrates at 900 a fourth implementation of a biometric identification system that uses uncertainty aware fusion of multimodal biometric data, according to some implementations.

In comparison to the implementation of FIG. 1, in this implementation the uncertainty module(s) 120 comprise a portion of one or more of the embedding module(s) 168. For example, an embedding module 168 trained to process input image data 112 associated with a particular modality may also be trained to determine the uncertainty data 126 associated with that modality.

The remainder of the system as shown at 900 operates as described previously, such as with regard to FIG. 1.

FIG. 10 is a flow diagram 1000 of a process to determine comparison data 188 based on uncertainty data 126, according to some implementations. The process may be implemented by one or more of the computing device 106, the computing device 118, or other devices.

At 1002 first biometric data associated with a first modality is determined. For example, an input device 104 may be used to acquire first modality image data 114. In another example the first modality image data 114 or first modality representation data 134 may be retrieved.

At 1004 first embedding data is determined based on the first biometric data. For example, the first modality image data 114 may be processed by an embedding module 168 to determine the first embedding data 172(1).

At 1006 second biometric data associated with a second modality is determined. For example, the input device 104 may be used to acquire second modality image data 116. In another example the second modality image data 116 or second modality representation data 136 may be retrieved.

At 1008 second embedding data is determined based on the second biometric data. For example, the second modality image data 116 may be processed by an embedding module 168 to determine the second embedding data 174(1).

At 1010 first uncertainty data 126(1) associated with the first embedding data 172(1) is determined. For example, the uncertainty modules 120 may operate as described above to determine the first uncertainty data 126(1). The first uncertainty data 126(1) may comprise parameters indicative of one or more of internal uncertainty or external uncertainty.

At 1012 second uncertainty data 126(2) associated with the second embedding data 174(1) is determined. For example, the uncertainty modules 120 may operate as described above to determine the second uncertainty data 126(2). The second uncertainty data 126(2) may comprise parameters indicative of one or more of internal uncertainty or external uncertainty.

In other implementations, additional uncertainty data 126 may be determined for respective modalities used.

At 1014 third embedding data associated with the first modality is determined. For example, the third embedding data may be retrieved from the enrolled user data 142, determined based on processing a second set of input image data 112 using the embedding module 168, and so forth.

At 1016 fourth embedding data associated with the second modality is determined. For example, the fourth embedding data may be retrieved from the enrolled user data 142, determined based on processing the second set of input image data 112 using the embedding module 168, and so forth.

At 1018 third uncertainty data 126(3) associated with the third embedding data 172(2) is determined. For example, the uncertainty modules 120 may operate as described above to determine the third uncertainty data 126(3). The third uncertainty data 126(3) may comprise parameters indicative of one or more of internal uncertainty or external uncertainty.

At 1020 fourth uncertainty data 126(4) associated with the fourth embedding data 174(2) is determined. For example, the uncertainty modules 120 may operate as described above to determine the fourth uncertainty data 126(4). The fourth uncertainty data 126(4) may comprise parameters indicative of one or more of internal uncertainty or external uncertainty.

At 1022 a first distance is determined in a first embedding space based on the first embedding data 172(1) and the third embedding data 172(2). For example, the embedding data may be considered vectors and the first distance may comprise a Euclidean distance between those vectors.

At 1024 a second distance is determined in a second embedding space based on the second embedding data 174(1) and the fourth embedding data 174(2).

At 1026 a first weight value is determined based on one or more of the first distance, the second distance, the first uncertainty data 126(1), the second uncertainty data 126(2), the third uncertainty data 126(3), or the fourth uncertainty data 126(4). For example, the first weight value may comprise $p_{fused}$ as described above with regard to Equation 20.

At 1028 comparison data 188 is determined based on one or more of the first distance, the second distance, or the first weight value.

The devices and techniques described in this disclosure may be used in a variety of other settings. For example, the system 100 may be used in conjunction with a point-of-sale (POS) device. The user may present their hand 102 to an input device 104 to provide an indication of intent and authorization to pay with an account associated with the asserted identification data. In another example, a robot may incorporate an input device 104. The robot may use the asserted identification data to determine whether to deliver a parcel to the user, and based on the asserted identification data, which parcel to deliver.

While the input to the system 100 is discussed with respect to image data, the system may be used with other types of input. For example, the input may comprise data acquired from one or more sensors 618, data generated by another system, and so forth. For example, instead of image data produced by the camera 108, the input to the system 100 may comprise an array of data. Other modalities may also be used. For example, the first modality may be visible light, the second modality may be radar, and so forth.

While the system 100 is discussed with respect to processing biometric data, the system may be used with other types of data. For example, the input may comprise remote sensing data, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more memories, storing first computer-executable instructions; and one or more hardware processors to execute the first computer-executable instructions to:

determine first input image data associated with a first modality, wherein the first input image data associated with the first modality is further associated with internal factors of a hand of a user;

determine first embedding data representative of the internal factors of the hand of the user as depicted in the first input image data;

determine second input image data associated with a second modality, wherein the second input image data associated with the second modality is further associated with external factors of the hand of the user;

determine second embedding data representative of the external factors of the hand of the user as depicted in the second input image data;

determine first uncertainty data indicative of uncertainties associated with the internal factors of the hand of the user;

determine second uncertainty data indicative of uncertainties associated with the external factors of the hand of the user;

determine first XOR embedding data that is representative of features that are not associated with both the first embedding data and the second embedding data;

determine third embedding data associated with the first modality, wherein the third embedding data associated with the first modality is further associated with internal factors of an enrolled hand of a corresponding user;

determine fourth embedding data associated with the second modality, wherein the fourth embedding data associated with the second modality is further associated with external factors of the enrolled hand of the corresponding user;

determine third uncertainty data indicative of uncertainties associated with the internal factors of the enrolled hand of the corresponding user;

determine fourth uncertainty data indicative of uncertainties associated with the external factors of the enrolled hand of the corresponding user;

determine second XOR embedding data that is representative of features that are not associated with both the third embedding data and the fourth embedding data;

determine a first distance in a first embedding space based on the first embedding data and the third embedding data;

determine a second distance in a second embedding space based on the second embedding data and the fourth embedding data;

determine a third distance in a third embedding space based on the first XOR embedding data and the second XOR embedding data;

determine a first weight value based on:

the first distance, the second distance, the third distance, the first uncertainty data, the second uncertainty data, the third uncertainty data, and the fourth uncertainty data;

determine comparison data based on:

the first distance, the second distance, the third distance, and the first weight value; and determine identification data based at least on the comparison data.

2. The system of claim 1, wherein one or more of the first, second, third, or fourth uncertainty data are indicative of one or more of:

uncertainty associated with physiological processes of the hand of the user as depicted in input image data, or uncertainty associated with one or more of:

pose of the hand of the user as depicted in the input image data, illumination of the hand of the user as depicted in the input image data, or presence of an obscurant on the hand of the user as depicted in the input image data.

3. The system of claim 1, the one or more hardware processors to further execute the first computer-executable instructions to:

determine the first embedding data using a first machine learning network to process the first input image data; and determine at least a portion of the first uncertainty data using at least a portion of the first machine learning network to process the first input image data.

4. The system of claim 1, the one or more hardware processors to further execute the first computer-executable instructions to:

retrieve the third embedding data and the fourth embedding data from enrolled user data; and wherein the determination of the identification data comprises determining, based on the comparison data and the enrolled user data, an asserted identity associated with the first input image data and the second input image data.

5. The system of claim 1, the one or more hardware processors to further execute the first computer-executable instructions to:

determine training data comprising a plurality of entries, each entry comprising:

first modality image data, second modality image data, and one or more labels comprising data indicative of one or more of:

a quality label indicative of an assessed image quality, a minutiae label indicative of friction ridge minutiae features, an obscurant label indicative of presence of an obscuring material on at least a portion of the hand, a visibility label indicative of an assessed visibility of features on at least a portion of the hand, or a pose label indicative of a pose of the hand; and train a machine learning network, using the training data, to determine at least a portion of the first uncertainty data.

6. The system of claim 1, the one or more hardware processors to further execute the first computer-executable instructions to:

determine first representation data using a first machine learning network to process the first input image data;

determine the first embedding data using a second machine learning network to process the first representation data;

determine second representation data using a third machine learning network to process the second input image data; and determine the second embedding data using a fourth machine learning network to process the second representation data.

7. The system of claim 1, the one or more hardware processors to further execute the first computer-executable instructions to:

determine first intersection embedding data that is representative of features that are associated with both the first embedding data and the second embedding data;

determine second intersection embedding data that is representative of features that are associated with both the third embedding data and the fourth embedding data;

determine a fourth distance in a fourth embedding space based on the first intersection embedding data and the second intersection embedding data;

determine the first weight value further based on the fourth distance; and determine the comparison data further based on the fourth distance.

8. A computer-implemented method comprising:

determining first biometric data associated with a first modality, wherein the first biometric data associated with the first modality is further associated with internal factors of a portion of a user;

determining first embedding data representative of the internal factors of the portion of the user depicted in the first biometric data;

determining second biometric data associated with a second modality, wherein the second biometric data associated with the second modality is further associated with external factors of the portion of the user;

determining second embedding data representative of the external factors of the portion of the user depicted in the second biometric data;

determining first uncertainty data indicative of uncertainties associated with the internal factors of the portion of the user;

determining second uncertainty data indicative of uncertainties associated with the external factors of the portion of the user;

determining third embedding data associated with the first modality, wherein the third embedding data associated with the first modality is further associated with internal factors of an enrolled portion of a corresponding user;

determining fourth embedding data associated with the second modality, wherein the fourth embedding data associated with the second modality is further associated with external factors of the enrolled portion of the corresponding user;

determining third uncertainty data indicative of uncertainties associated with the internal factors of the enrolled portion of the corresponding user;

determining fourth uncertainty data indicative of uncertainties associated with the external factors of the enrolled portion of the corresponding user, wherein one or more of the first uncertainty data, the second uncertainty data, the third uncertainty data, or the fourth uncertainty data is indicative of:

uncertainty associated with physiological processes of the portion of the user depicted in the first or second biometric data;

determining a first distance in a first embedding space based on the first embedding data and the third embedding data;

determining a second distance in a second embedding space based on the second embedding data and the fourth embedding data;

determining a first weight value based on:

the first distance, the second distance; and one or more of:

the first uncertainty data, the second uncertainty data, the third uncertainty data, or the fourth uncertainty data;

determining comparison data based on:

the first distance, the second distance, and the first weight value; and determining identification data based at least on the comparison data.

9. The computer-implemented method of claim 8, wherein one or more of the first, second, third, or fourth uncertainty data are further indicative of one or more of:

uncertainty associated with one or more of:

pose of the portion of the user as depicted in the biometric data, illumination of the portion of the user depicted in the biometric data, or presence of material on the portion of the user depicted in the biometric data.

10. The computer-implemented method of claim 8, further comprising:

determining first XOR embedding data that is representative of features that are not associated with both the first embedding data and the second embedding data;

determining second XOR embedding data that is representative of features that are not associated with both the third embedding data and the fourth embedding data;

determining a third distance in a third embedding space based on the first XOR embedding data and the second XOR embedding data;

determining the first weight value further based on the third distance; and determining the comparison data further based on the third distance.

11. The computer-implemented method of claim 8, further comprising:

determining first intersection embedding data that is representative of features that are associated with both the first embedding data and the second embedding data;

determining second intersection embedding data that is representative of features that are associated with both the third embedding data and the fourth embedding data;

determining a third distance in a third embedding space based on the first intersection embedding data and the second intersection embedding data;

determining the first weight value further based on the third distance; and determining the comparison data further based on the third distance.

12. The computer-implemented method of claim 8, further comprising:

determining the first embedding data using a first machine learning network to process the first biometric data; and determining at least a portion of the first uncertainty data using at least a portion of the first machine learning network to process the first biometric data.

13. The computer-implemented method of claim 8, further comprising:

retrieving the third embedding data and the fourth embedding data from enrolled user data; and wherein the determining the identification data comprises determining, based on the comparison data and the enrolled user data, an asserted identity associated with the first biometric data and the second biometric data.

14. The computer-implemented method of claim 8, further comprising:

determining third biometric data associated with the first modality;
determining the third embedding data based on the third biometric data;
determining fourth biometric data associated with the second modality;
determining the fourth embedding data based on the fourth biometric data; and
wherein the first biometric data, the second biometric data, the third biometric data, and the fourth biometric data are acquired using a first device.

15. The computer-implemented method of claim 8, further comprising:
determining training data comprising a plurality of entries, each entry comprising:
first modality image data,
second modality image data; and
one or more labels comprising data indicative of one or more of:
a quality label indicative of an assessed image quality,
a minutiae label indicative of friction ridge minutiae features,
an obscurant label indicative of presence of an obscuring material on at least a portion of a hand,
a visibility label indicative of an assessed visibility of features on at least a portion of the hand, or
a pose label indicative of a pose of the hand; and
training a machine learning network, using the training data, to determine at least a portion of one or more of the first uncertainty data, the second uncertainty data, the third uncertainty data, or the fourth uncertainty data.

16. The computer-implemented method of claim 8, further comprising:
determining first representation data using a first machine learning network to process the first biometric data;
determining the first embedding data using a second machine learning network to process the first representation data;
determining second representation data using a third machine learning network to process the second biometric data; and
determining the second embedding data using a fourth machine learning network to process the second representation data.

17. A system comprising:
one or more memories, storing first computer-executable instructions; and
one or more hardware processors to execute the first computer-executable instructions to:
determine first biometric data associated with a first modality, wherein the first biometric data associated with the first modality is further associated with internal factors of a hand of a user;
determine first embedding data representative of the internal factors of the hand of the user depicted in the first biometric data;
determine second biometric data associated with a second modality, wherein the second biometric data associated with the second modality is further associated with external factors of the hand of the user;
determine second embedding data representative of the external factors of the hand of the user depicted in the second biometric data;
determine first uncertainty data indicative of uncertainties associated with the internal factors of the hand of the user;
determine second uncertainty data indicative of uncertainties associated with the external factors of the hand of the user;
determine third embedding data associated with the first modality, wherein the third embedding data associated with the first modality is further associated with internal factors of an enrolled hand of a corresponding user;
determine fourth embedding data associated with the second modality, wherein the fourth embedding data associated with the second modality is further associated with external factors of the enrolled hand of the corresponding user;
determine third uncertainty data indicative of uncertainties associated with the internal factors of the enrolled hand of the corresponding user;
determine fourth uncertainty data indicative of uncertainties associated with the external factors of the enrolled hand of the corresponding user;
determine a first distance in a first embedding space based on the first embedding data and the third embedding data;
determine a second distance in a second embedding space based on the second embedding data and the fourth embedding data;
determine a first weight value based on:
the first distance,
the second distance; and
one or more of:
the first uncertainty data,
the second uncertainty data,
the third uncertainty data, or
the fourth uncertainty data; and
determine comparison data based on:
the first distance,
the second distance, and
the first weight value.

18. The system of claim 17, the one or more hardware processors to further execute the first computer-executable instructions to:
determine first XOR embedding data that is representative of features that are not associated with both the first embedding data and the second embedding data;
determine second XOR embedding data that is representative of features that are not associated with both the third embedding data and the fourth embedding data;
determine a third distance in a third embedding space based on the first XOR embedding data and the second XOR embedding data;
determine the first weight value further based on the third distance; and
determine the comparison data further based on the third distance.

19. The system of claim 17, the one or more hardware processors to further execute the first computer-executable instructions to:
determine the first embedding data using a first machine learning network to process the first biometric data; and
determine at least a portion of the first uncertainty data using at least a portion of the first machine learning network to process the first biometric data.

20. The system of claim 17, the one or more hardware processors to further execute the first computer-executable instructions to:

determine training data comprising a plurality of entries, each entry comprising:

first modality image data, second modality image data; and one or more labels comprising data indicative of one or more of:

a quality label indicative of an assessed image quality, a minutiae label indicative of friction ridge minutiae features, an obscurant label indicative of presence of an obscuring material on at least a portion of a corresponding hand, a visibility label indicative of an assessed visibility of features on at least a portion of the corresponding hand, or a pose label indicative of a pose of the corresponding hand; and train a machine learning network, using the training data, to determine at least a portion of one or more of the first uncertainty data, the second uncertainty data, the third uncertainty data, or the fourth uncertainty data.

* * * * *